INVENTOR
Adolph Karl Rapp
BY Samuel Cohen
ATTORNEY

LEGEND

INVENTOR
Adolph Karl Rapp
BY Samuel Cohen
ATTORNEY

United States Patent Office 3,382,455

Patented May 7, 1968

3,382,455

LOGIC GATE PULSE GENERATOR

Adolph Karl Rapp, Princeton, N.J., assignor to Radio Corporation of America, a corporation of Delaware Filed Apr. 3, 1967, Ser. No. 627,844
4 Claims. (Cl. 331—111)

ABSTRACT OF THE DISCLOSURE

A chain of logic gates interconnected so that they tend to oscillate and a circuit for deriving from the chain in response to a single phase alternating signal, multiple phase output pulses.

*Background of the invention*

In certain integrated circuit applications, multiple phase pulses are needed for controlling the operation of transistors in an array. Such pulses are desired to be synchronous with trigger signals. An object of this invention is to provide such a generator which is simple, reliable and relatively inexpensive. Another object of the invention is to provide such a circuit which readily can be integrated along with the circuit to be driven by its multiple phase output pulses.

*Summary of the invention*

The circuit of the invention comprises a plurality of multiple input logic gates, each connected to apply its output to two of the other gates and each gate receiving two inputs from two other gates. A trigger pulse is applied directly to one of the gates and through an inverter to another of the gates.

*Detailed description*

Figure 1:
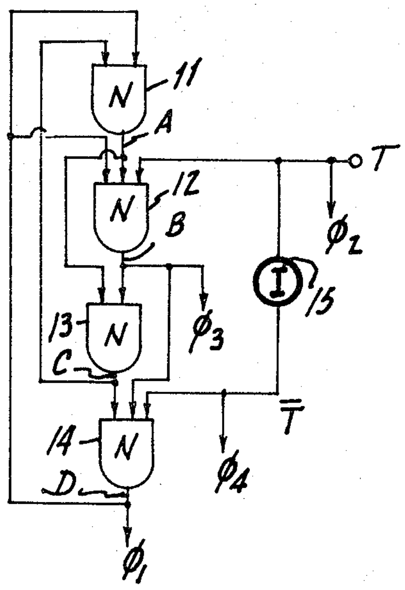
FIGURE 1 is a block diagram of the circuit of the invention.

The gate employed in the circuit of FIGURE 1 is a NOR gate. The Boolean equation for the gate is $\overline{xy}=z$ or $\overline{x+y}=z$, where $x$ and $y$ represent input signals indicative of binary digits (bits) and $z$ represents an output signal indicative of a bit. The truth table for the gate is:

| x y | z |
|---|---|
| 0 0 | 1 |
| 0 1 | 0 |
| 1 0 | 0 |
| 1 1 | 0 |

For purposes of the present explanation, the convention is adopted that a signal at a relatively low level, such as ground, represents the bit 0 and a signal at a relatively high level, such as +V volts, represents the bit. 1. To simplify the discussion, a signal representing the bit 1 or 0 is sometimes referred to hereafter as a 1 or 0, respectively.

The circuit of FIGURE 1 includes four NOR gates 11–14, respectively. Each $i$'th gate receives two inputs, one from the $$i \underset{4}{\ominus} 1\text{'th gate}$$

and the other from the $$i \underset{4}{\ominus} 2\text{'th gate}$$

where $i$ is some number from 1 to 4 and $$\underset{4}{\ominus}$$

represents modulo 4 subtraction. In less technical terms, the fourth gate 14, for example, receives an input from the third gate 13 and an input from the second gate 12. As another example, the second gate 12 receives an input from the first gate 11 and an input from the fourth gate 15, and so on.

Figure 3:
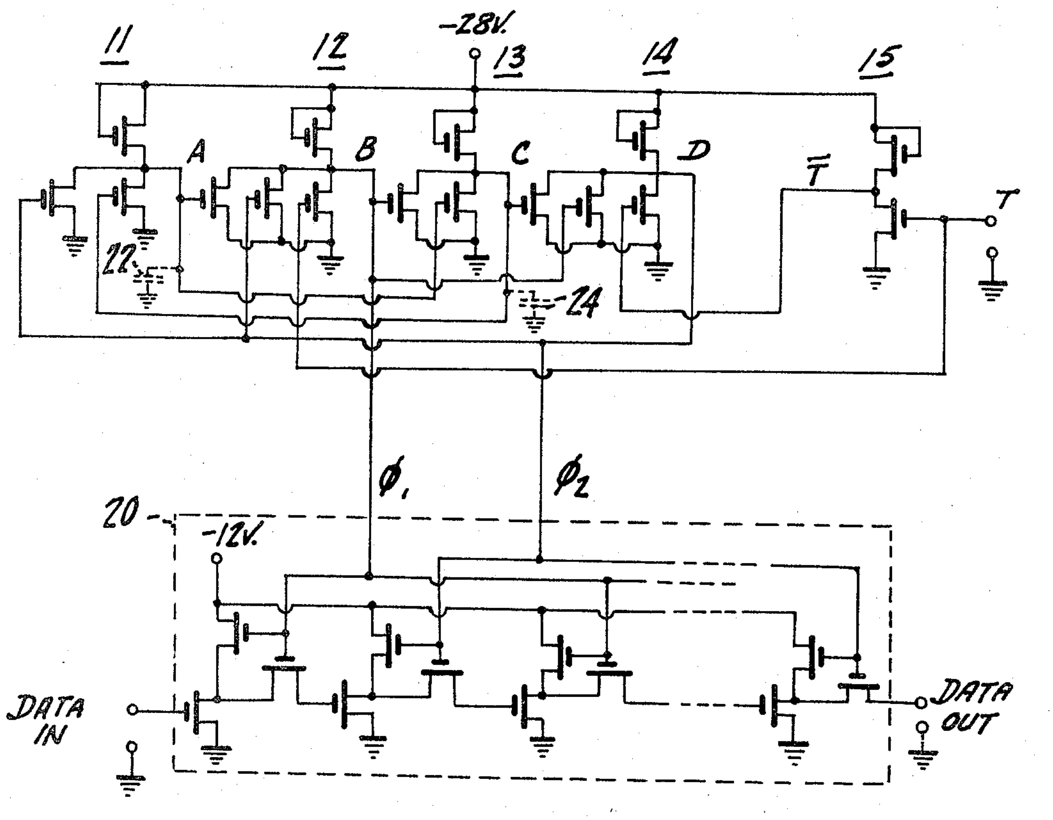
FIGURE 3 is a schematic showing of the circuit of the invention implemented with field-effect, MOS transistors, and driving a shift register made also of MOS transistors.
Figure 3:
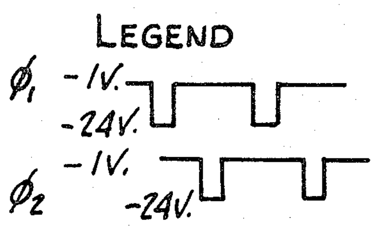

In the absence of the inverter 14 and the trigger pulses T and $\overline{T}$, the chain of 4 NOR gates oscillates as discussed, in detail, in application Ser. No. 551,065, titled "Logic Gate Oscillator," filed May 18, 1966 by William Henn issued on Oct. 31, 1967 as Patent No. 3,350,659 and assigned to the same assignee as the present application. Note that in the copending application, a 1 is represented by a relatively low signal level and a 0 by a relatively high signal level. However, this is purely arbitrary and does not affect the circuit operation. The circuit preferred for the NOR gate in a particular application is an integrated circuit such as shown in FIGURE 3. However, the invention is perfectly general and any other type of NOR gate may be used instead as, for example, the one shown in FIGURE 1*b* of the copending application.

In accordance with the present invention, a trigger pulse T is applied as a third input to the $i$'th one of the NOR gates and the complement of the trigger pulse is applied by inverter 15 to the $$i \underset{4}{\oplus} 2\text{'th NOR gate}$$

For example, in the embodiment shown, a trigger pulse is applied to gate 12 and the complement of the trigger pulse is applied to gate 14. Note that the gates are interconnected in a ring so that any one of the gates may be selected to receive the trigger pulse provided that the second following gate receives the complement of the trigger pulse.

Figure 2:
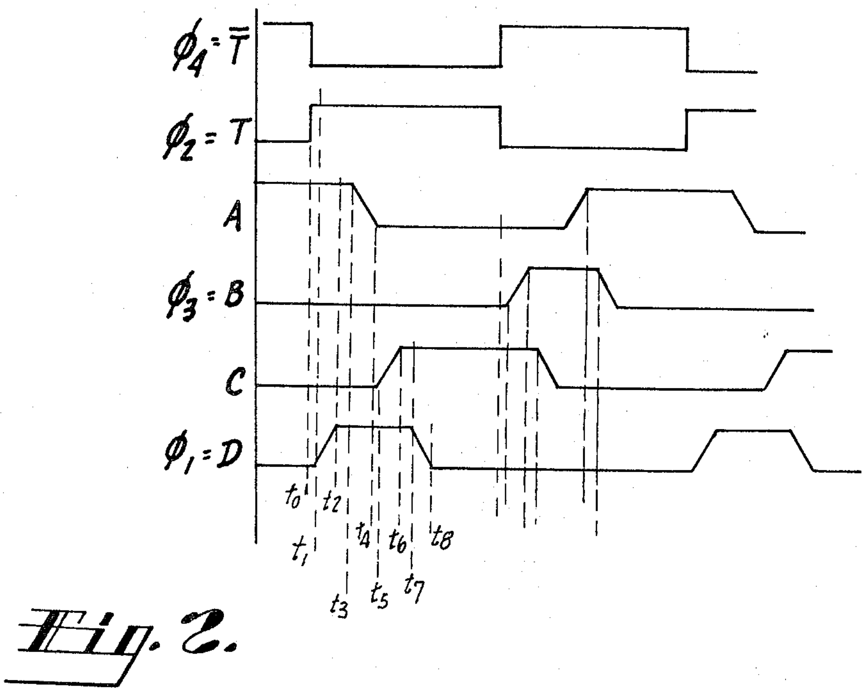
FIGURE 2 is a drawing of waveforms to help explain the operation of the circuit of FIGURE 1.

The operation of the circuit of FIGURE 1 is depicted in FIGURE 2. Initially, $T=0$, $A=1$, $B=0$, $C=0$ and $D=0$. This is a stable circuit condition. At time $t_0$, T changes to 1 and $\overline{T}$ changes to 0 (the delay inserted by the inverter 15 is relatively small and is ignored for purposes of this discussion). Now, all three inputs to NOR gate 14, namely C, B and $\overline{T}$ have the value 0 so that after the brief interval required for NOR gate 14 to turn on, D becomes 1. In FIGURE 2 the interval $t_0$ to $t_1$ is the delay interval before which D starts changing and the interval $t_1$ to $t_2$ is the time required for D to reach its final value. It might be mentioned here that these various times will depend upon the parameters of the actual circuits employed and in any particular design may not be proportional to the times shown. However, the principles involved hold for all circuits such as shown.

At time $t_2$, the $D=1$ applied to NOR gate 11 tends to disable this NOR gate. During the interval $t_3$ to $t_4$ the output A of NOR gate 11 changes from 1 to 0.

At time $t_4$, the two inputs to NOR gate 13, namely A and B, both have the value 0 so that C tends to become 1. During the period $t_5$ to $t_6$ C does change from 0 to 1.

The $C=1$ input to NOR gate 14 tends to disable this NOR gate. During the interval $t_7$ to $t_8$ NOR gate 14 does become disabled and its output changes from $D=1$ back to $D=0$.

Summarizing the operation discussed up to this point, the change in the value of the trigger pulse T from 0 to 1 has caused D first to change from 0 to 1 and, after a predetermined interval, to change back from 1 to 0. Thus, in response to one transition of T, an output pulse D has been produced. In an embodiment of the invention of particular utility in connection with the driving of four-phase integrated transistor arrays, the D pulse is considered the phase 1 pulse and the T pulse the phase 2 pulse. Note that the D pulse starts a short interval after the T pulse and the T pulse is longer than the D pulse. The durations, rise time and other parameters of the waves produced by the circuit will depend upon the characteristics of the transistors, the circuit layout and so on. However, a typical circuit of the type shown in FIGURE 3 may produce pulses of somewhat less than ½ microsecond in duration and with a rise time of under 100 nanoseconds.

When T changes from 1 back to 0, a B pulse is generated in the manner shown in FIGURE 2. When T changes to 0, all three inputs to NOR gate 12 are 0 and B changes to 1. The change B to 1 disables NOR gate 13 and C changes to 0. When the latter occurs, both inputs to NOR gate 11 are 0 and A changes to 1. The change of A to 1 disables NOR gate 12 so that B changes back to 0. Note that the B pulse starts shortly after the $\overline{T}=1$ pulse and note also that the $\overline{T}=1$ pulse is of substantially longer duration than the $B=1$ pulse. Note also that the D pulse and B pulse are of equal duration and that the phase relationship between the B and $\overline{T}$ pulses is the same as that between the T and D pulses. In one particular class of circuits, the B pulse is phase 3 of a multiple phase pulse source and the $\overline{T}$ pulse is the phase 4 pulse. These phases 1 to 4 are legended: $\phi_1$, $\phi_2$, $\phi_3$, $\phi_4$ in FIGURE 2.

The circuit of the invention is also useful for driving two-phase integrated circuits. An example which shows the internal configuration of the two-phase generator and which also shows the details of the circuit being driven is shown in FIGURE 3. The two-phase generator consists of field-effect P-type transistors of the MOS type and is illustrated in the upper part of the figure. The stages 11–15 correspond to the similarly legended stages of FIGURE 1 as do the leads at which the various pulses are obtained. Note that the phase 1 ($\phi_1$) pulses are obtained from lead B and the phase 2 ($\phi_2$) pulses from lead D. Note also that since P-type transistors are employed, the two-phase pulses are negative-going. Note also that these pulses do not overlap in time.

The circuit being driven within dashed box 20 is an MOS transistor shift register. The phase 1 pulses are applied to the first, third and other odd numbered stages and the phase 2 pulses are applied to the second, fourth and other even numbered stages. The operation of the shift register should be self-evident from the figure.

The actual duration of the B and D pulses in the circuit of the invention can be controlled by minor circuit additions. For example, if the transistors of stages 11 and 13 are capacitively loaded at their output terminals to slow down their transitions, the widths of the B and D pulses will be increased, but with no appreciable degradation in their transition times. Such elements are shown in phantom view at 22 and 24 in FIGURE 3.

While the circuit of the invention is shown to be implemented with NOR gates, it should be appreciated that other logic gates may be used instead. As one example, NAND gates may be employed in which case the B and D pulses will be of opposite polarity to those shown.

What is claimed is:

1. In combination: a plurality of multiple input logic gates, each connected to apply its output to two of the other gates and each gate receiving its two inputs from two other gates; and means for applying a trigger signal to one of the gates and its complement to another of the gates.

2. In the combination set forth in claim 1, said logic gates comprising NOR gates.

3. In the combination set forth in claim 2, said circuit consisting of four NOR gates, each $i$'th gate applying its output to the $$i \underset{4}{\oplus} 1\text{'th and the } i \underset{4}{\oplus} 2\text{'th gate}$$

and said means applying said trigger signal, applying the same to said $i$'th gate and applying the complement of said trigger signal to the $$i \underset{4}{\oplus} 2\text{'th gate}$$

where $$\underset{4}{\oplus}$$

represents modulo 4 addition.

4. In the combination set forth in claim 1, said logic gates each comprising a plurality of field-effect transistors.

References Cited

UNITED STATES PATENTS 3,350,659 10/1967 Henn ............ 331—113

JOHN KOMINSKI, *Primary Examiner.*

ROY LAKE, *Examiner.*